United States Patent [19]
McGee

[11] Patent Number: 5,926,909
[45] Date of Patent: Jul. 27, 1999

[54] REMOTE CONTROL VACUUM CLEANER AND CHARGING SYSTEM

[76] Inventor: Daniel McGee, P.O. Box 15126, Honolulu, Hi. 96830

[21] Appl. No.: 08/703,941

[22] Filed: Aug. 28, 1996

[51] Int. Cl.⁶ .................... A47L 5/00; A47L 5/22
[52] U.S. Cl. .............................. 15/339; 15/340.1
[58] Field of Search .............. 15/319, 339, 340.1, 15/340.2, 340.3

[56] References Cited

U.S. PATENT DOCUMENTS

| | | | |
|---|---|---|---|
| 4,306,329 | 12/1981 | Yokoi | 15/340.1 |
| 4,369,543 | 1/1983 | Chen et al. | 15/340.1 |
| 4,513,469 | 4/1985 | Godfrey et al. | 15/340.2 |
| 4,934,020 | 6/1990 | Jackson . | |
| 5,005,252 | 4/1991 | Steiner et al. . | |
| 5,024,626 | 6/1991 | Robbins et al. . | |
| 5,322,469 | 6/1994 | Tilbor . | |
| 5,497,529 | 3/1996 | Boesi | 15/340.3 |
| 5,560,077 | 10/1996 | Crotchett | 15/339 |
| 5,709,007 | 1/1998 | Chiang | 15/339 |

FOREIGN PATENT DOCUMENTS

| | | | |
|---|---|---|---|
| 4-96719 | 3/1992 | Japan | 15/319 |
| 4-295323 | 10/1992 | Japan | 15/339 |

*Primary Examiner*—Terrence Till
*Attorney, Agent, or Firm*—Donn K. Harms

[57] ABSTRACT

A hand-held remote control device sending signals for speed and direction to a remote control vacuum cleaner vehicle system enhancing an axle motor or motors for action of vehicle and separate motor or motors for vacuuming to suck up debris. The assembly also includes a hard plastic re-charge housing unit system co-operable with the hand-held remote controller unit system and the remote control vacuum cleaner vehicle unit system for charging the battery of the remote controller system and remote control vacuum cleaner vehicle system. The remote control vacuum cleaner vehicle system outer casing is a hard plastic housing where remote control vacuum cleaner vehicle system rechargeable battery operated axle motor is mounted for action of vehicle and when other mounted rechargeable battery operated motor or motors is activated suction from opening sucks up debris into housing and into removable debris canister. Remote control vacuum cleaner vehicle system further includes receiving antenna for receiving radio signals sent from a hand-held remote controller system which is used to remotely control the remote vacuum cleaner vehicle.

6 Claims, 7 Drawing Sheets

REMOTE CONTROL VACUUM CLEANER AND CHARGING SYSTEM

BACKGROUND OF THE INVENTION

1. Field of Invention

The present invention relates to vacuum cleaner as a Remote Control Vacuum Cleaner and in particular to a rechargeable battery operated hand-held remote controller sending signals to the rechargeable battery operated remote control vacuum cleaner vehicle for movement and steering of the vehicle while vacuuming debris into a remote control vacuum cleaner vehicle canister. A combination recharging unit base storage unit is provided for receiving a hand-held remote controller and remote control vacuum cleaner vehicle to be charged.

2. Description of Related Art.

Remote control toy vehicles and charging assemblies have been popular and such toys include battery operated motor-driven vehicles and a separate remote hand controller which controls the action of the motor in the vehicle through radio control signals. Such remote control systems include such simple remote controls as those that cause the vehicle to go forward in a straight direction, those that permit control of the motor in forward and reverse directions and those which permit both movement of the vehicle and steering thereof. U.S. Pat. No. 5,322,469 Jun. 21, 1994 and U.S. Pat. No. 5,024,626 June 1991.

Currently, there exist hand-held portable vacuum cleaners having a recharging assembly for batteries, a motor, a fan driven by the motor for producing a vacuum, a canister for at least the reception of air and foreign matter drawn into the canister in response to the vacuum produced by the fan and a battery power source for powering the motor.

It has been recognized that it is generally desirable that a vacuum cleaner itself not have any cord extending therefrom for recharging purposed and also been recognized that a combination battery recharging base which may be plugged into a conventional wall socket for drawing 110-volt AC current therefrom, for stepping the current down to an appropriate voltage level, and for converting the altering current to direct current and vacuum holder can be utilized for the dual purpose of storing the vacuum cleaner, affecting the charging of the battery pack within vacuum cleaner.

The prior art cordless appliances (whether vacuum cleaners or otherwise) and recharging bases typically utilize the recharging electrical terminals for the dual purpose of recharging and positively holding the vacuum cleaner vehicle or other appliances in place on the recharging base. Such prior art includes U.S. Pat. No. 5,005,252 Apr. 9, 1991 and U.S. Pat. No. 4,934,020 Jun. 19, 1990.

While such prior art portable cordless vacuum cleaners worked well for their intended purpose, the Remote Control Vacuum Cleaner vehicle can complete a vacuuming task with less physical effort, because of the remote control, which would be great for disabled or less than fully functional persons. Also, because the remote control vacuum cleaner is motorized, it can complete a vacuuming task faster and more efficiently, using motorized speed in forward and reverse directions in conjunction with steering and mobility. The small design of the devices allows it to go under objects. Return or departure of the remote control vacuum cleaner vehicle to the recharging unit base and storage unit assembly may be controlled by the hand-held remote controller allowing easy access to remote control vacuum cleaner and charging unit. Unlike some big, heavy, bulky units which must be dragged over vacuuming surfaces, the hand-held remote controller sending signals to the remote control vacuum vehicle to glide over vacuuming surfaces allows the remote controller to do all the hard work.

SUMMARY OF THE INVENTION

Accordingly, the present invention is a vacuum cleaner vehicle system, controlled by remote controller system and a recharging base unit system for recharging and storing the hand-held remote controller system and remote control vacuum cleaner vehicle system.

The remote control vacuum cleaner vehicle system operation and direction is provided by signals from a hand-held remote controller signal system. That communication from the hand held remote controller causes the remote control vacuum cleaner vehicle system to move in a forward and reverse direction and also communicates signals which permit both movement of the vehicle and steering thereof. In a preferred embodiment the hand-held remote controller is made of plastic resin material and conventionally operated by a finger of a user. Such operation sends signals to control forward and reverse action of the remote control vacuum cleaner vehicle system. At least one other switch, actuatable by another finger of the user, sends signals for steering of the remote control vacuum cleanser vehicle. The hand held remote controller system has a shape complementary to the outer surface of said charging unite base system for removably securing the remote controller and engaging said charging unit system for the charging of its power source.

The remote control vacuum cleaner vehicle system, is controlled by remote controller system sending signals permitting a user to operate a remote control vacuum cleaner vehicle system, having a motor or motors adapted to selectively drive vehicle in a forward and reverse directions which is coupled through a gear train to the wheels. The remotely controlled vacuum cleaner vehicle system is constructed of a housing of plastic resin material having a gently curving shape configuration while extending upwardly and rearwardly while housing and enclosing the motor or motors. The housing may also support a plurality of batteries, with the housing having a shape complementary to the outer surface of said charging unit system for removably securing the remote control vacuum cleaner vehicle system and engaging charging unit system for the charging of power source, for powering the motor or motors. The housing also supports a fan driven by the motor or motors producing a vacuum for a canister for at least the reception of air and foreign matter drawn into a detachable canister, (for emptying foreign matter), in response to the vacuum produced by the fan.

The assembly also includes a charging unit system having a bottom surface adapted to be supported by support surface and co-operable with the remote control vacuum cleaner vehicle system and hand-held remote controller system for charging the power source thereof. The assembly further includes means for removability securing the remote control vacuum cleaner vehicle to the charging unit when the vacuum cleaner vehicle engages the charging unit. The charging unit system housing, comprised of plastic resin material, forms a pivot point to allow remote control vacuum cleaner vehicle system to disengage from bottom wall when remote control vacuum cleaner system is pivoted by an operator by remote control, to move remote control vacuum cleaner vehicle system. The charging unit system bottom wall is constructed to extend upwardly and forms a pivot point to allow a remote controller system to disengage from charging bottom. The charging unit system is co-operable with remote controller system and also the remote control vacuum cleaner vehicle system removably securing said systems while engaging the charging unit for charging the power source.

One advantage of the Remote Control Vacuum Cleaner is to complete a vacuuming task by remote control.

Another advantage is the Remote Control Vacuum Cleaner is a remote control wireless vacuum cleaner.

A additional advantage of the Remote Control Vacuum Cleaner is a remote control vacuum cleaner with motorized controls.

A further advantage is the Remote Control Vacuum Cleaner is a remote control vacuum cleaner with recharging capabilities.

An additional advantage is the Remote Control Vacuum Cleaner is that it can be removed from, and returned to, the charging unit, by remote control.

A still further advantage is the preferred design of the Remote Control Vacuum Cleaner for mowing under and around the obstacles.

Another advantage is the short radius of steering and unique steering capabilities in forward or reverse directions of Remote Control Vacuum Cleaner.

An additional advantage of the Remote Control Vacuum Cleaner is the speed to complete a vacuuming task in a forward or reverse direction, unlike the walking speed of a conventional vacuum cleaner cordless or otherwise.

Another advantage is the Remote Control Vacuum Cleaner hand-held rechargeable remote controller sending signal to the remote control vacuum cleaner vehicle from on the many different locations.

While the essential features of the invention have been disclosed and described above with respect to a preferred embodiment, one of the ordinary skill will appreciate that the invention may assume any of the wide variety of configuration.

BRIEF DESCRIPTION OF THE DRAWINGS

FIG. 5 is a perspective view of the hand-held remote controller, its switches, antenna, and rechargeable battery contact strips.

Corresponding reference characters indicate corresponding parts throughout the several views of the drawings.

Reference Numerals In Drawings

10. Remote Controller
12. Remote Control Vacuum Cleaner Vehicle
14. Charging Unit Base and Storage Unit
16. Remote Controller Housing
18. Remote Controller Rechargeable Batteries
20. Action Switch on Remote Controller
22. Steering Switch on Remote Controller
24. Remote Controller Antenna
26. Remote Controller Recharging Battery Contact Strip
28. Remote Controller Concave Design Compatible to Charging-Storage Unit.
30. Remote Control Vacuum Cleaner Vehicle Housing
32. Remote Control Vacuum Cleaner Vehicle Removable Canister.
34. Remote Control Vacuum Cleaner Vehicle Conventional Reversible Electric Motor
36. Remote Control Vacuum Cleaner Vehicle Wheels
38. Remote Control Vacuum Cleaner Vehicle Steering Axle, Drive Housing
40. Remote Control Vacuum Cleaner Vehicle Vacuum Motor
42. Remote Control Vacuum Cleaner Vehicle Motor Fan
44. Remote Control Vacuum Cleaner Vehicle Vacuum Motor Shaft
46. Remote Control Vacuum Cleaner Vehicle Nozzle
48. Remote Control Vacuum Cleaner Vehicle Release Canister Switch for Emptying Debris
50. Remote Control Vacuum Cleaner Vehicle Space Fins
52. Remote Control Vacuum Cleaner Vehicle Rechargeable Battery Contact Strips
54. Remote Control Vacuum Cleaner Vehicle Rechargeable Batteries
56. Remote Control Vacuum Cleaner Vehicle ON-OFF motors switch for activating vehicle action and Vacuum Motor
58. Remote Control Vacuum Cleaner Vehicle Electric Wiring
60. Remote Control Vacuum Cleaner Vehicle Remote Control Antenna
62. Charging Unit Housing
64. Charging Unit Electric Cord—Power Lead
66. Charging Unit Wiring
68. Charging Unit Rechargeable Battery Charger Contact Strips Compatible to Remote Controller Battery Charger Contact Strips
70. Charging Unit Rechargeable Battery Charger Contact Strips Compatible to Remote Control Vacuum Cleaner Vehicle Battery Charger Contact Strips
72. Charging Unit Remote Controller Storage in Corresponding Cavity
74. Charging Unit Remote Control Vacuum Cleaner Vehicle Storage in Corresponding Wheel Well Cavity
76. Charging Unit Pedestal
78. Charging Unit

DESCRIPTION OF THE PREFERRED EMBODIMENTS

Figure 1:
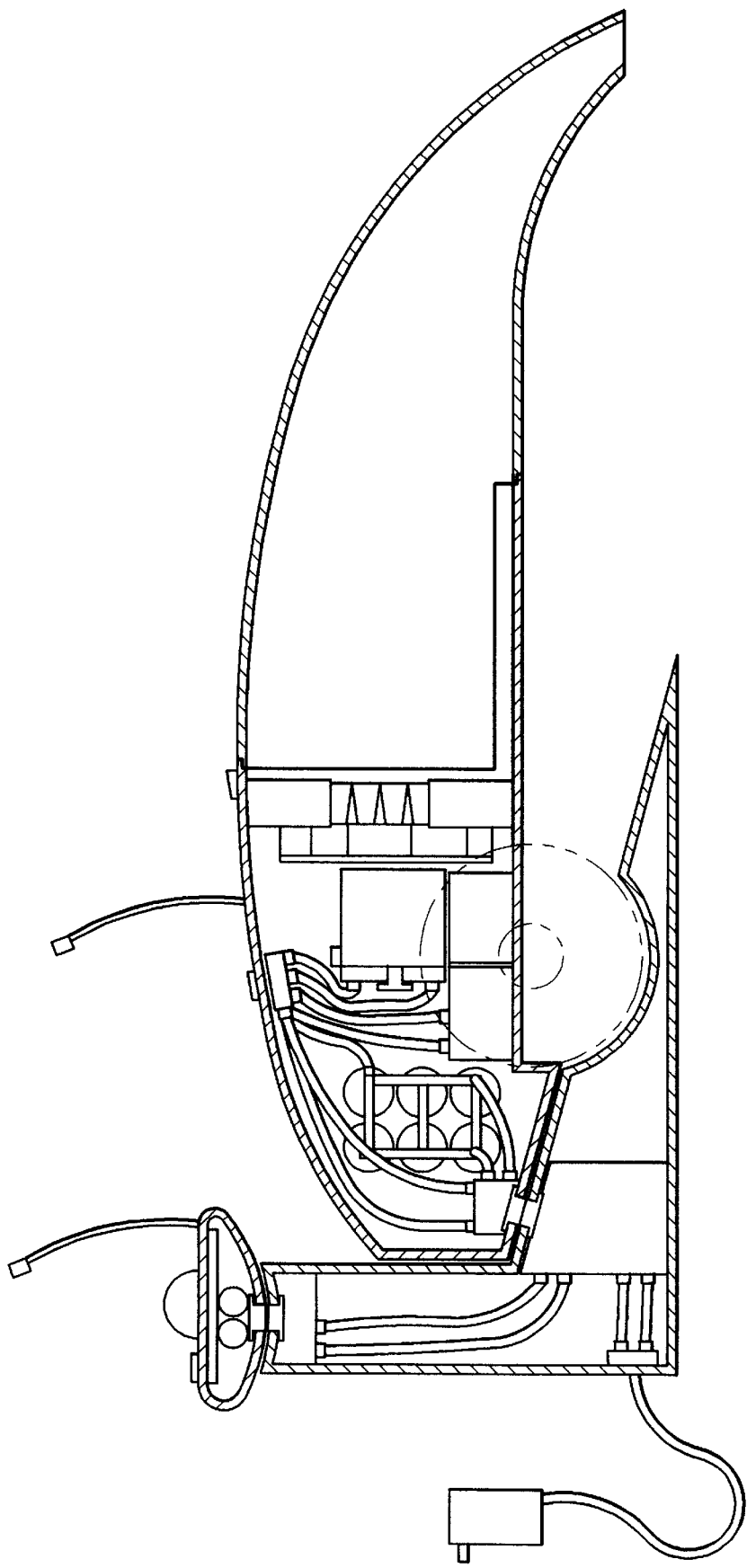
FIG. 1 is present invention—REMOTE CONTROL VACUUM CLEANER AND CHARGING UNIT.
Figure 2:
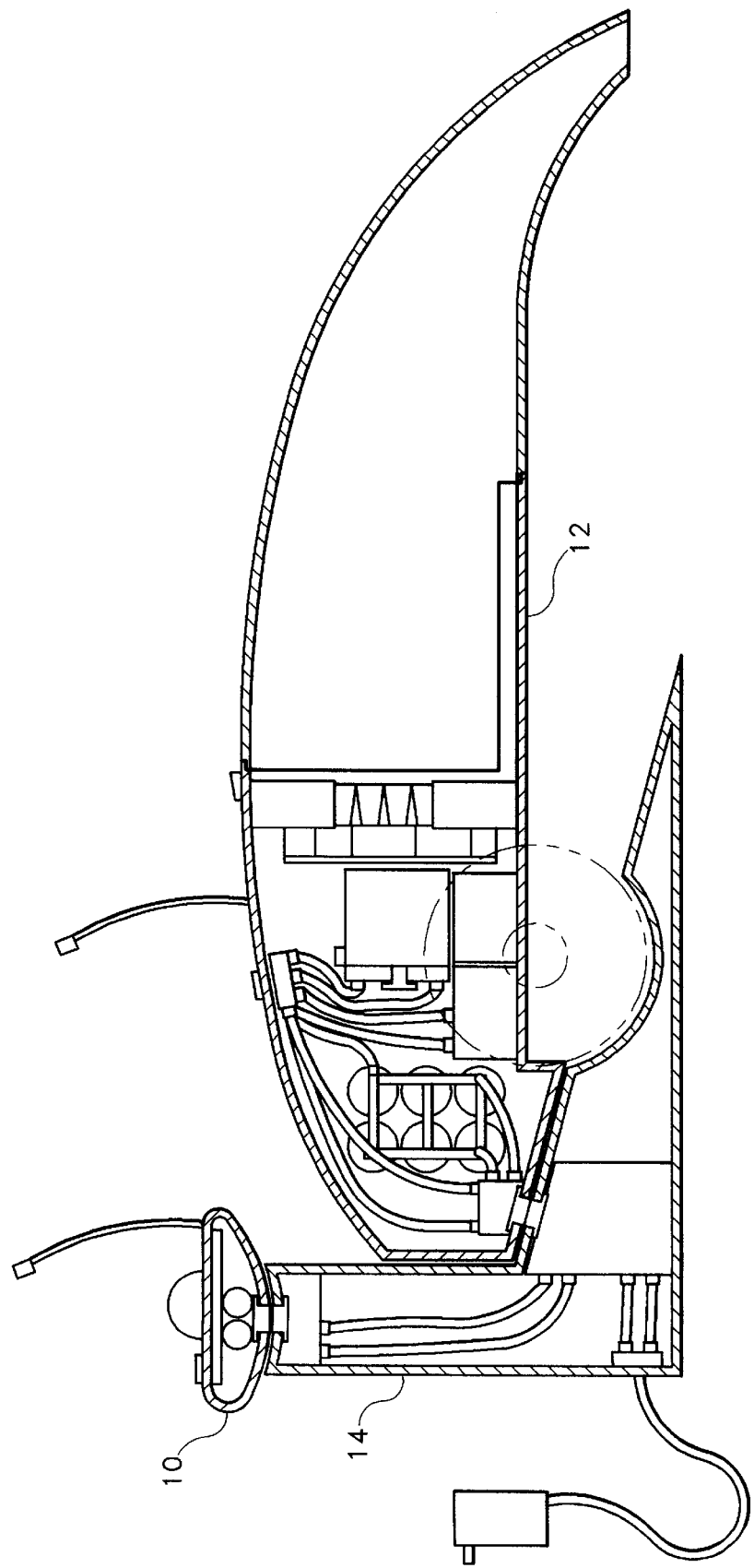
FIG. 2 is a longitudinal cross section of remote controller stored on charging unit, remote control vacuum cleaner vehicle stored on charging unit, charging unite base combination storage unit.

Referring now to the drawings, to FIG. 2 a Remote Control Vacuum Cleaner including a remote controller 10, a remote control vacuum cleaner vehicle 12, and a with combination charging and storage unit 14 is shown. Referring now to a longitudinal cross section FIG. 3 the hand-held remote controller 10 comprises a central housing 16 having rechargeable batteries 18, rechargeable battery contact strips 26, concave design compatible to charging unit base 28, configured to be grasp by the hand of a person hand of a person using switches 20, 22, to sending signals by remote control (radio control) antenna 24, to direct the movement of the remote control vacuum cleaner vehicle 12, for the cleaning of rugs, floors, and such other surfaces.

In a preferred embodiment the remote controller 10, is a hand-held battery operated and includes a switch 20, operable by a finger of a user which controls action 20 of the vehicle and at least on other switch 22, which controls steering 22 thereof.

The remote control vacuum cleaner vehicle 12 comprises a central housing 30, having a removable canister 32, for emptying debris, motor or motors 34 for movement of wheels 36, steering 38, and vehicle direction. A vacuum motor 40 communicates with fan 42, to produce a vacuum. Rechargeable batteries 54 in contact with rechargeable battery contact strips 53, provided a power source. Antenna 60, to receive signals is affixed to the remote control vacuum cleaner vehicle 12. The remote control vacuum cleaner vehicle housing 30, also contains a source of suction from a fan 42, which may also be referred to as a blower or impeller, and an electric motor 40, coupled by a shaft 44, to the fan 42. Rotation of the shaft 44, by the motor 40, imparts rotation to the fan 42, to create a partial vacuum and accompanying suction which draws air and foreign matter into the nozzle 46, of the canister 32. The canister 32, may be removed from housing via switch 48, for the emptying of debris sucked up by vacuum. The air exits the housing through a side aperture which is covered by a plurality of spaced fins 50. The rechargeable electric vacuum motor 40, and remote control vacuum cleaner vehicle rechargeable electric motor 34, are powered by a power source comprising at least one preferably, a plurality of rechargeable batteries 54. A ON-OFF switch 56 is position on the upperside of the canister 32, for convenient engagement by means of the thumb of a person utilizing the remote control vacuum cleaner vehicle 12. Operation of the ON-OFF switch 56, provides for the coupling of electric power from the batteries 56, to the motor or motors 34,40 for activation. Conventional electric wiring 58, connects the batteries 54, via circuit board, not shown, to switch 54, and motor or motors 34,40.

Figure 3:
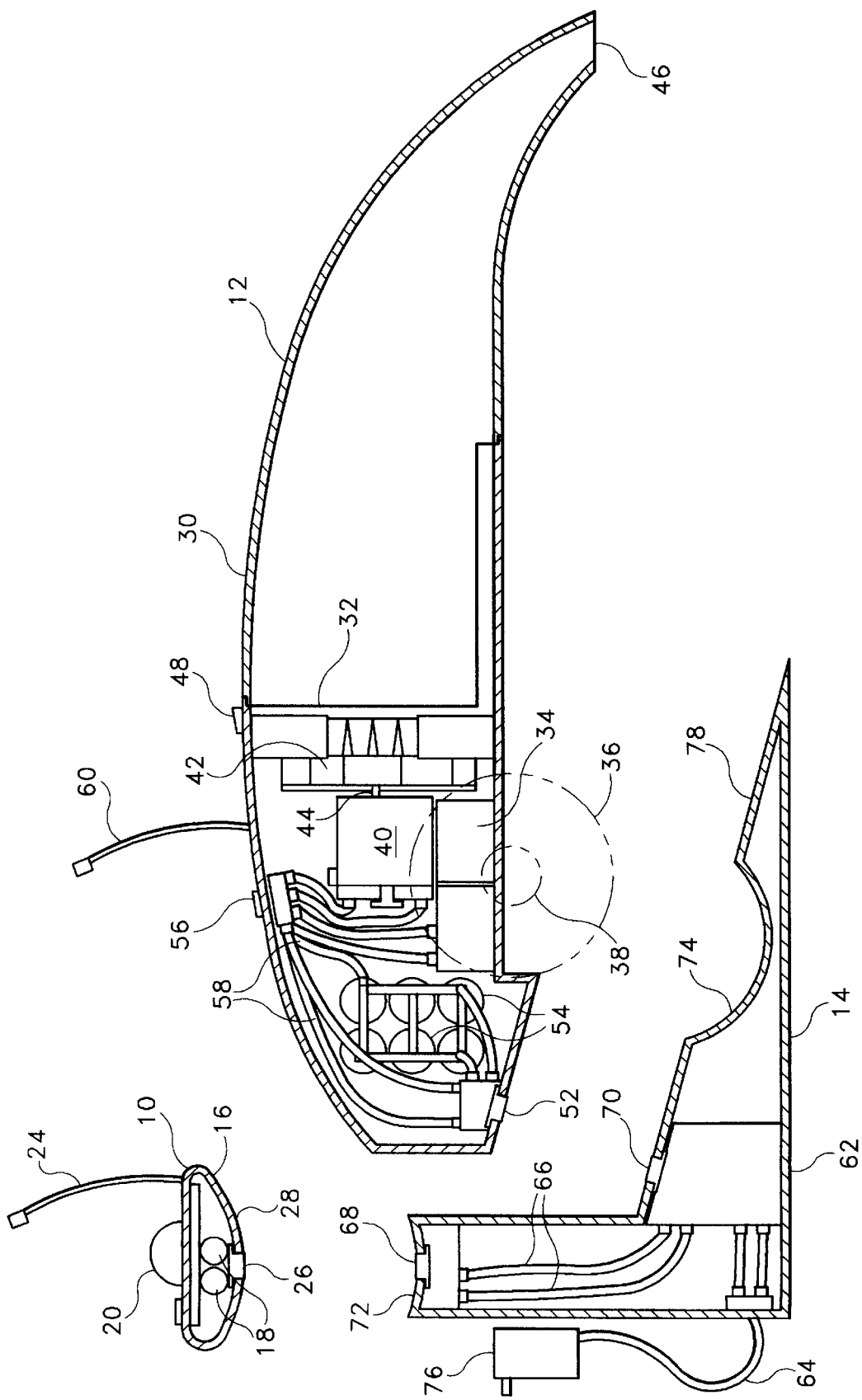
FIG. 3 is a longitudinal cross section illustrating details of construction of remote controller, remote control vacuum cleaner vehicle, charging storage unit.
Figure 4:
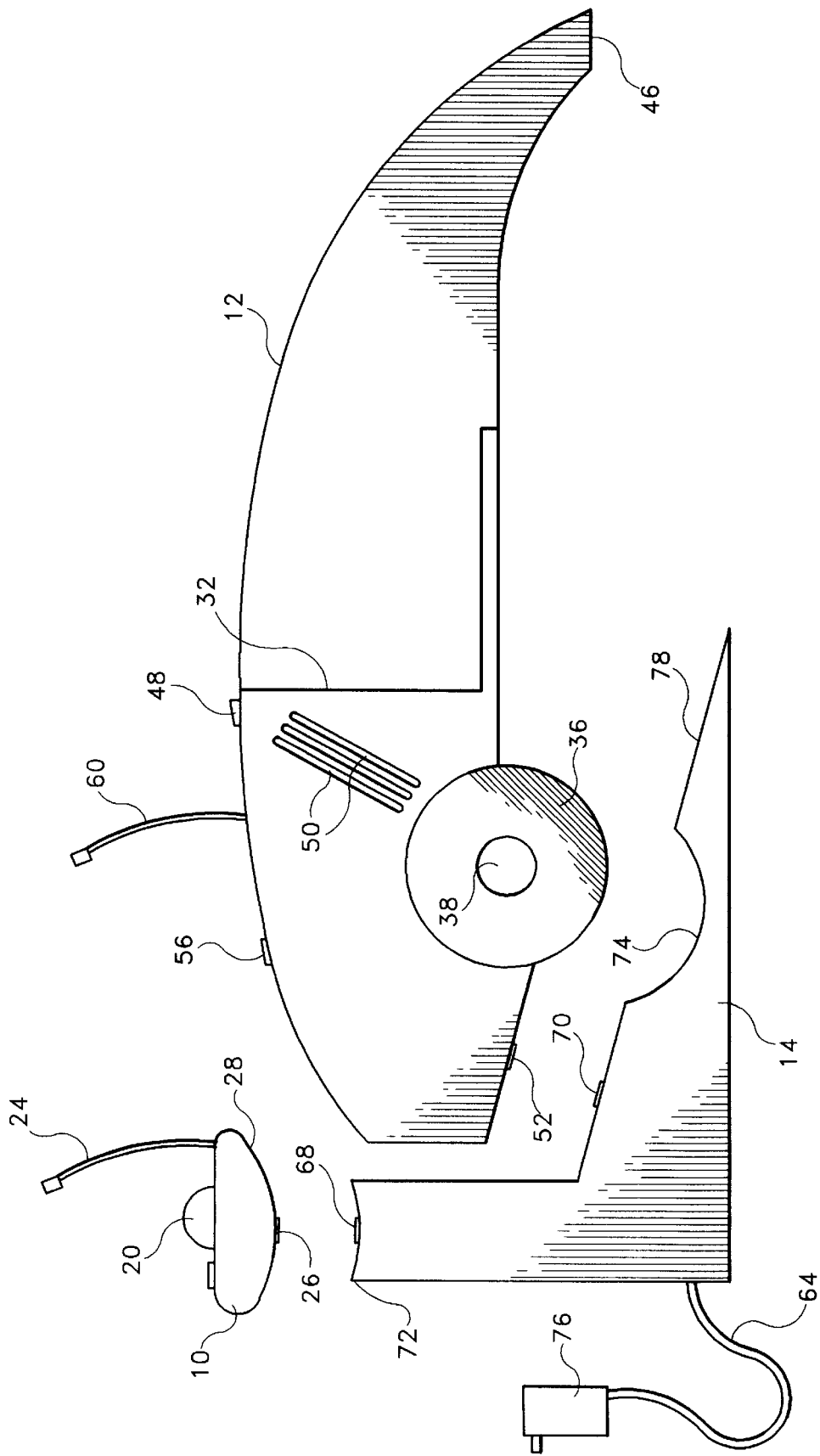
FIG. 4 is a longitudinal cross section view illustrating remote controller, remote control vacuum cleaner vehicle compatible electrical contact strips and concave storage with charging unit.
Figure 6:
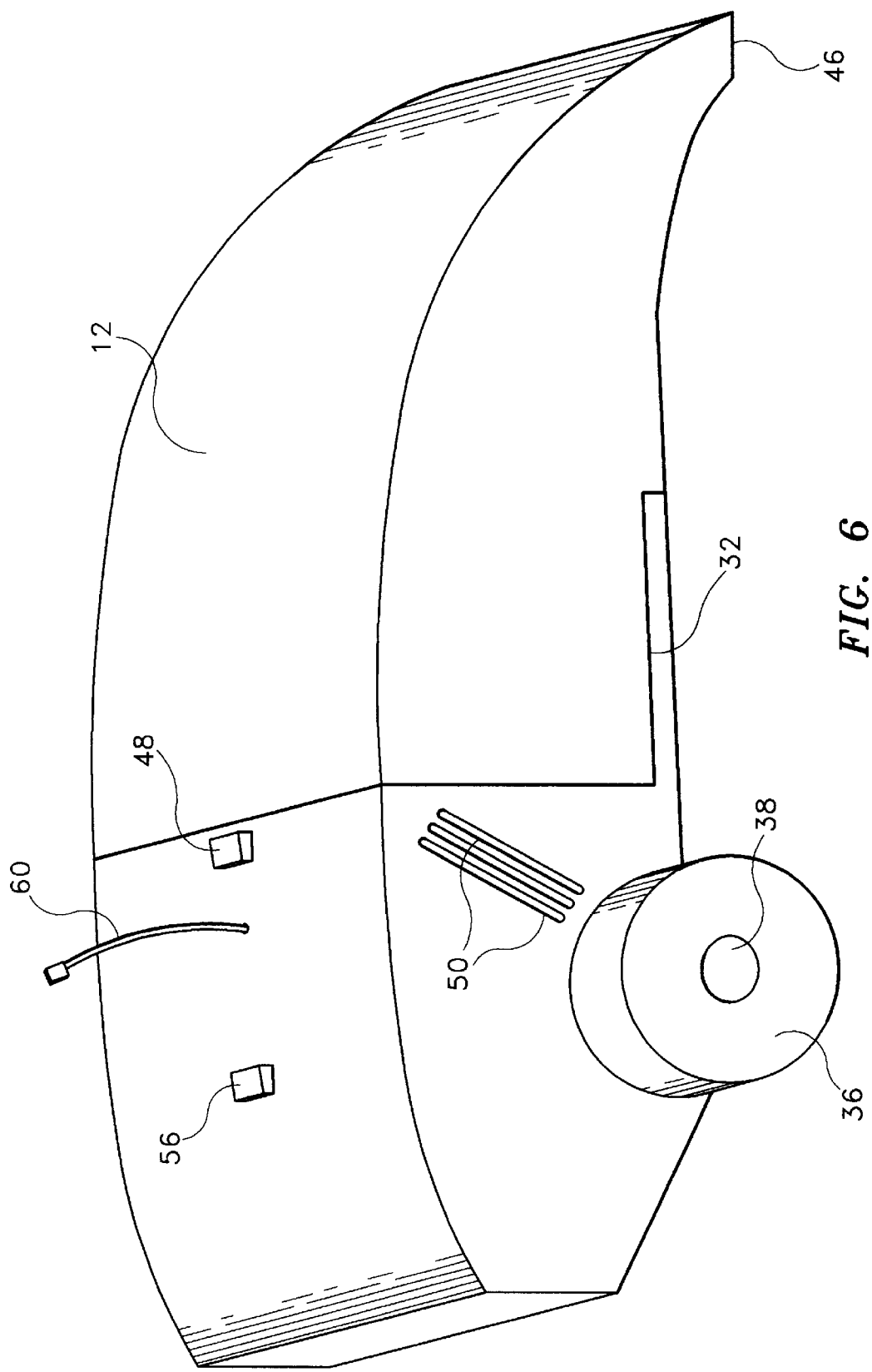
FIG. 6 is a perspective view of the remote control vacuum cleaner vehicle its ON-OFF switch, canister release switch, antenna, spaced fins, wheel, rechargeable battery contact strip.
Figure 7:
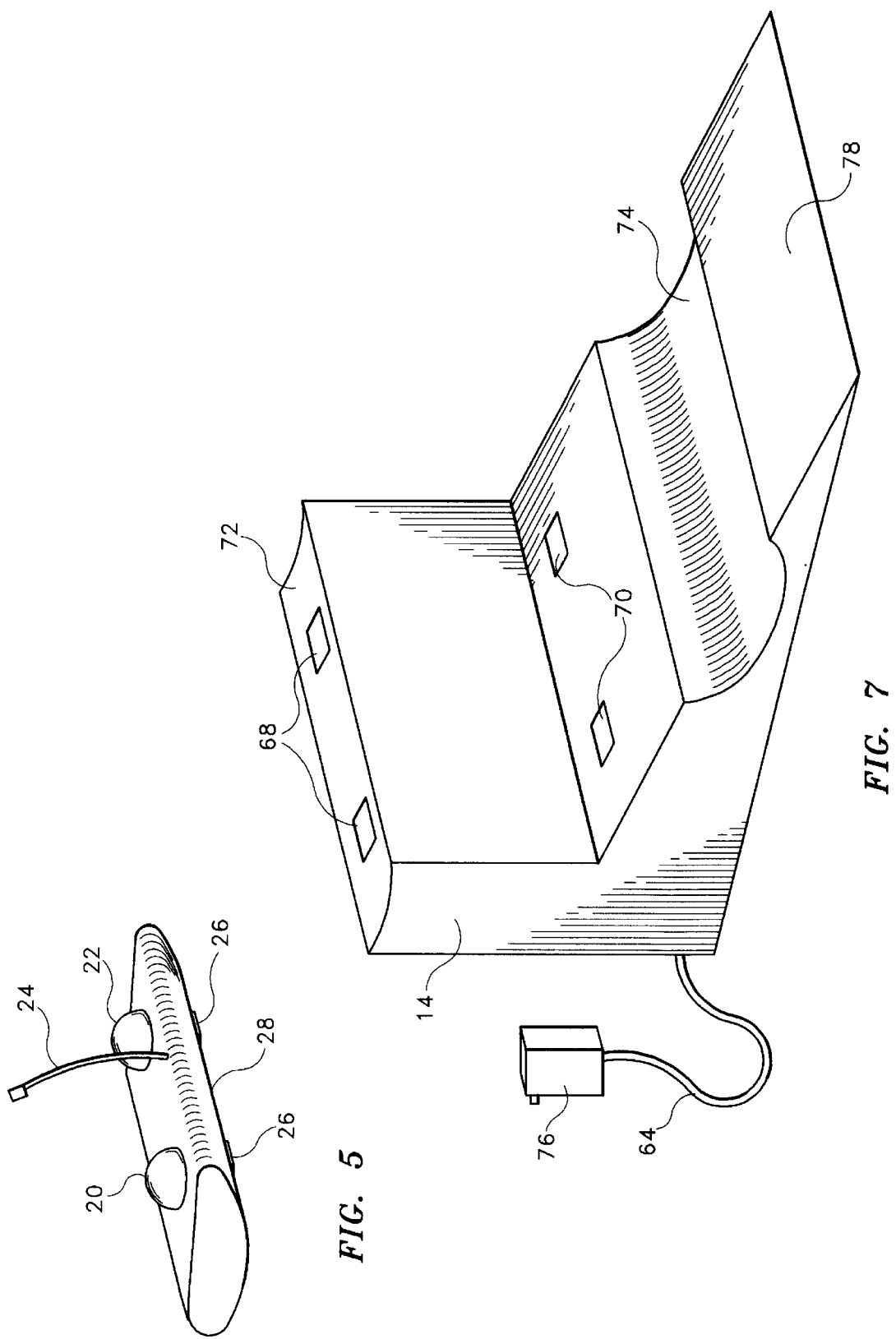
FIG. 7 is a perspective view of charging unit and storage unit with AC-DC recharging adapter, charging strip, and concave storage for remote controller and remote control vacuum vehicle.
Figure 8:
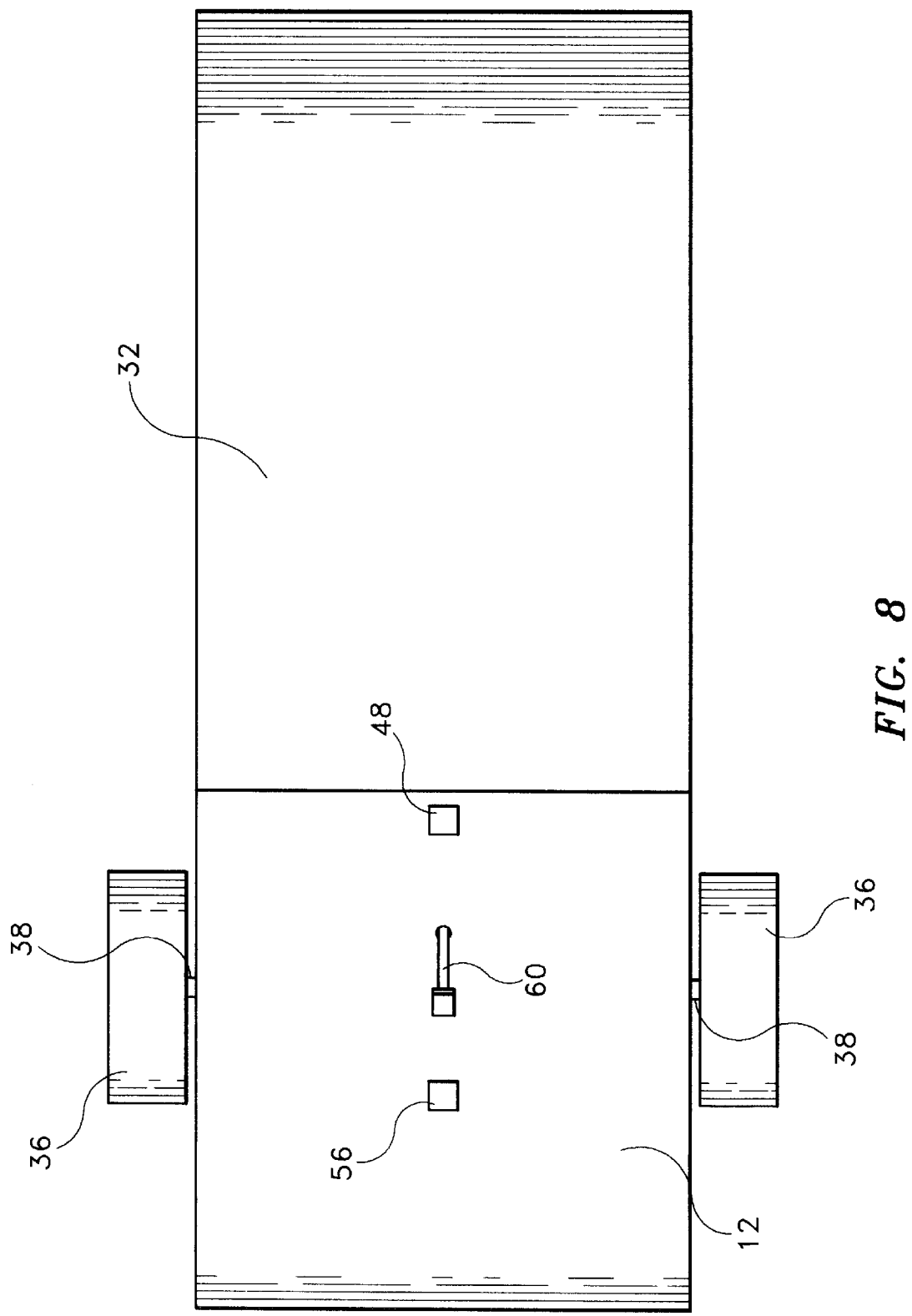
FIG. 8 is a to view of remote control vacuum vehicle with axle and wheels.

Referring to FIG. 3, a combination charging unit base and storage unit 14, consists of housing 62, for charging the batteries 18, and 54 or power source during a period of non-use (storage) of the remote control vacuum cleaner vehicle 12, and remote controller 10, as shown. An AC/DC recharging adapter 76, is connected to the recharging base 14, by a power lead 64, in a conventional manner as will appear for recharging a rechargeable battery 18, 54, as recognized by those skilled in the art. The charging unit 14 is connected by a suitable electric cord 64 (partially shown) to a conventional electrical convenience power outlet in the home or other location where the remote control vacuum cleaner vehicle 12, and hand-held remote controller 10, is stored 14. It should be appreciated that the charging unit base—storage unit 14, maybe secured to a horizontal support or mounting surface by the use of fasteners of the like. The charging unit base/storage unit 14, is generally rectangular in shape and has a bottom adapted to be supported by the support surface. The charging unit base—storage unit 14 , is made of a plastic material. The charging unit base 14, includes a pedestal 78, which is generally rectangular in shape and is disposed in corresponding cavity formed in the housing of the hand-held remote controller 72, and the remote control vacuum cleaner vehicle 74, engaging the charging unit base 14, for charging of batteries 18, 54, of the remote controller 10 and remote control vacuum cleaner vehicle 12. The charging unit base 14, includes wires 66, connecting the power source, a pair of contact strips 68, 70, which contact a corresponding pair of contacts 26 on the housing of the remote controller 10, and remote control vacuum cleaner vehicle 52, which are electrically connected to the batteries 18,54 to permit electrical charging contact of the batteries 18, 54, In operation, when the batteries 18, 54, or power source of the remote control vacuum cleaner vehicle 12, or handheld remote controller 10, need to be charged, or stored, the remote control vacuum cleaner vehicle 12, or hand-held remote controller 10, is disposed in the cavity of the charging unit 72,74 such that the bottom surface of the housing rest on the bottom of the cavity. The remote control vacuum cleaner vehicle wheels 36, fit into the wheel well cavity 74, recess in the housing 62. The pedestal 78 is deposed within the corresponding cavity 72,74, of the housing 62. The charging contacts and strips 68,70, engage each other to complete and electrical circuit to allow power to flow from an external power source 78, through the charging unit base 62 to the rechargeable batteries 18, 54, of power source of the remote control vacuum cleaner vehicle 12, and handheld remote controller 10.

When the remote control vacuum cleaner vehicle 12, is desired to remove from the recharging unit base—storage unit 14, the "ON" switch 56, on the remote control vacuum cleaner vehicle 12, is turned to "ON" to activate remote control signals 60 sent from the remote controller 10. The remote controller 10 sends signals through antenna 24, as directed by user, to drive remote control vacuum cleaner vehicle 12, disengaging charging unit base—storage unit 14, in a forward direction causing the remote control vacuum cleaner vehicle 12, to lever or pivot out of the wheel-well cavity 72 disengaging charging unit base—storage unit 14 and awaiting the next action from uses actuated action switch 20, on the remote controller 10. Another "ON" switch or the same "ON" switch 56, on the remote control vacuum cleaner vehicle also activates vacuum motor 56, and suction for picking up debris begins.

The remote control vacuum cleaner vehicle 12, drive housing 38, contains at least one conventional remote control vehicle reversible electrical motor 34, coupled to at least one of the wheels 36, by a suitable conventional gear train, not shown. A pair of such motors 34, may be provided to drive each of the rear wheels 36, independently which would inherently provide steering, or a single motor 34, or a pair of motors 34, geared together to simultaneously drive wheels 36. Remote control vacuum cleaner vehicle 12, may also support a plurality of batteries 54, for powering the motor or motors 34. A conventional linkage(not depicted) may also be used to pivot the wheels to steer the vehicle in either lateral directions.

Propulsion and steering action of the remote control vacuum cleaner vehicle may be entirely conventional in that of any number of arrangements previously used in radio controlled vehicles known to those of ordinary skill in this art.

As has been described thus far the Remote Control Vacuum Cleaner and Charging unit and its components are entirely conventional based on well known, existing designs.

It will thus be seen that the objects set forth above, among those made apparent from the preceding description, are efficiently attained and, since certain changes maybe made in the above constructions without departing from the spirit and scope of the invention, it is intended that all matter contained in the above description or shown in the accompanying drawings shall be interpreted as illustrative and not in a limiting sense.

What is claimed is:

1. A remote control vacuum cleaner system comprising:

a remote control vacuum cleaner having a housing, a plurality of wheels mounted to said housing, motor means for selectively driving said plurality of wheels, a detachable canister, said detachable canister releasably securable to said housing, a blower mounted to said housing, said blower in communication with said canister for forcibly drawing air and debris into said canister through a nozzle in communication with said canister, a first power source attached to said housing, said first power source for providing electrical power to components of said remote control vacuum cleaner requiring such electrical power;

a remote controller operatively attached to said remote control vacuum cleaner, said remote controller responsive to control signals from a source remote to said remote control vacuum cleaner;

a remote controller unit having a plurality of user activated switches thereon and a second power source located within said remote controller unit providing power thereto, said remote controller unit capable of communicating said control signals to said remote controller by operation of said user activated switches thereby remotely controlling propulsion and steering of said remote control vacuum cleaner; and a charging unit holder base cooperatively engageable with both said remote controller unit and said remote control vacuum cleaner, said charging unit holder base communicating electrical power to said first power source through cooperatively engaging electrical connections mounted on both of said charging unit holder base and on said remote control vacuum cleaner, thereby providing electrical power to recharge said first power source when said remote control vacuum cleaner is cooperatively engaged with said charging unit holder base.

2. The remote control vacuum cleaner system as set forth in claim 1 wherein said charging unit holder base communicates electrical power to recharge said second power source when said remote controller unit is cooperatively engaged therewith.

3. The remote control vacuum cleaner system and charging unit system set forth in claim 2 further comprising:

both said housing and said detachable canister having a shape complementary to an outer surface of said charging unit holder base thereby providing a storage rack for said remote control vacuum cleaner when cooperatively engaged therewith; and said charging unit holder base having a receiving cavity therein, said receiving cavity dimensioned to hold said remote control unit therein, thereby providing a storage compartment for said remote controller.

4. The remote control vacuum cleaner system and charging unit system set forth in claim 1 further comprising:

both said housing and said detachable canister having a shape complementary to an outer surface of said charging unit holder base thereby providing a storage rack for said remote control vacuum cleaner when cooperatively engaged therewith.

5. The remote control vacuum cleaner as set forth in claim 1 wherein said motor means for selectively driving said wheels is comprised of at least one electrical motor communicating rotation to said plurality of wheels.

6. The remote control vacuum cleaner as set forth in claim 1 wherein said motor means for selectively driving said wheels is a plurality of electrical motors each providing rotation to one of said plurality of wheels, whereby said propulsion and said steering of said remote controlled vacuum cleaner is remotely controlled by said signals from said remote control unit activating said at least one of said plurality of electrical motors.

* * * * *